United States Patent [19]

Tanaka et al.

[11] Patent Number: 5,237,252
[45] Date of Patent: Aug. 17, 1993

[54] METHOD OF DRIVING PLURAL LINEAR INDUCTION MOTORS IN A TRANSPORTING SYSTEM

[75] Inventors: Michihiro Tanaka; Junichi Teruta, both of Amagasaki, Japan

[73] Assignee: Hitachi Kiden Kogyo Kabushiki Kaisha, Hyogo, Japan

[21] Appl. No.: 815,197

[22] Filed: Dec. 31, 1991

[51] Int. Cl.$^5$ ............................................. B60L 9/16
[52] U.S. Cl. ................................. 318/587; 318/38; 318/135; 310/12; 104/25; 104/290
[58] Field of Search ............... 318/580, 587, 135, 38; 104/25, 130, 288, 290, 292; 310/12

[56] References Cited

U.S. PATENT DOCUMENTS

| | | | |
|---|---|---|---|
| 3,696,753 | 10/1972 | Ross et al. | 310/13 X |
| 3,719,869 | 3/1973 | Coho | 318/135 |
| 3,721,874 | 3/1973 | Pelenc et al. | 318/135 |
| 3,850,109 | 11/1974 | Thornton | 104/148 SS |
| 3,874,301 | 4/1975 | Alimanestianu . | |
| 4,068,152 | 1/1978 | Nakamura et al. | 318/135 |
| 4,348,618 | 9/1982 | Nakamura et al. | 318/38 |
| 4,361,095 | 11/1982 | Gibson | 104/292 |
| 4,454,457 | 6/1984 | Nakamura et al. | 318/135 |
| 4,825,111 | 4/1989 | Hommes et al. | 310/12 |
| 5,125,347 | 6/1992 | Takahashi et al. | 318/38 X |

*Primary Examiner*—Bentsu Ro
*Attorney, Agent, or Firm*—Wenderoth, Lind & Ponack

[57] ABSTRACT

A transporting system includes plural primary dispersedly arranged linear induction motors and plural continuously movable bodies connected by a secondary conductor in an endless path. At least one of the linear induction motors is directly controlled by an inverter control device, and the remaining linear induction motors are switchably connected to a power source. A running speed of the moveable bodies is detected, and the difference between the detected running speed and a desired running speed is used to control the inverter control device and the switching of the remaining induction motors to the power source. A voltage controller can be used in place of the inverter control device.

6 Claims, 4 Drawing Sheets

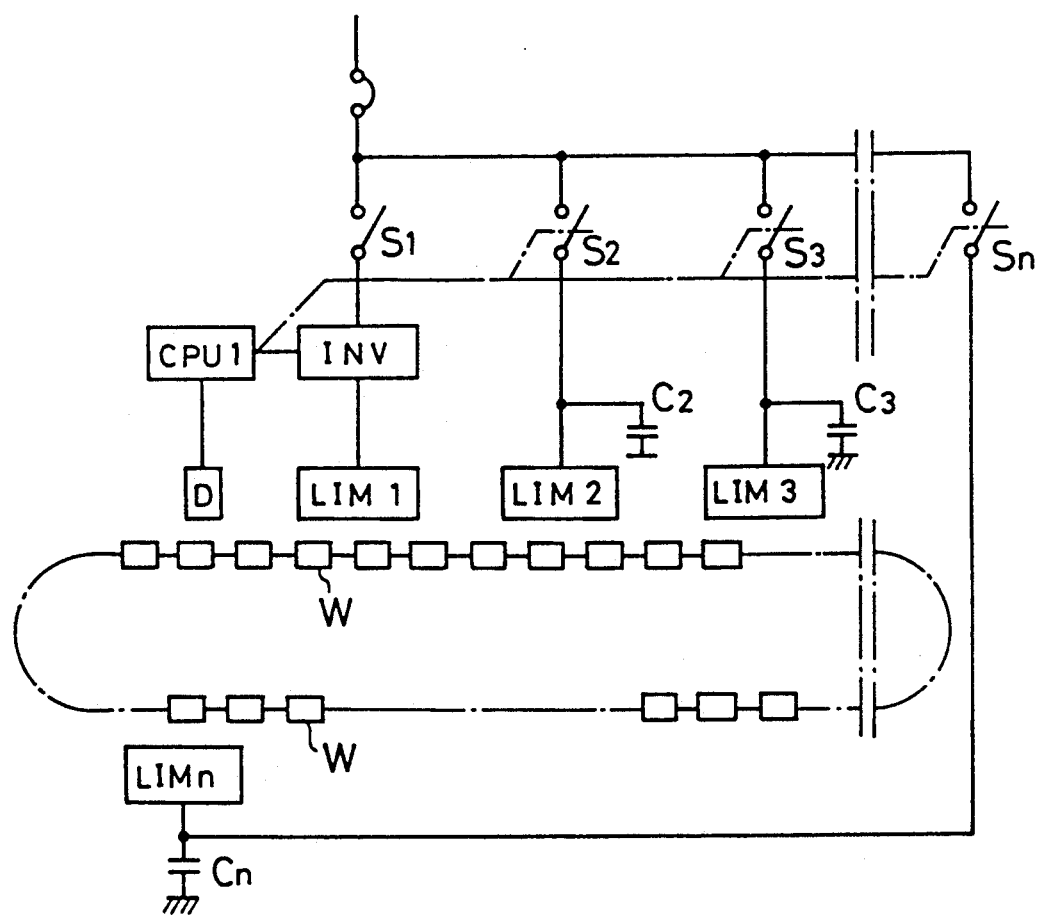
[Fig. 1]

[Fig. 2]
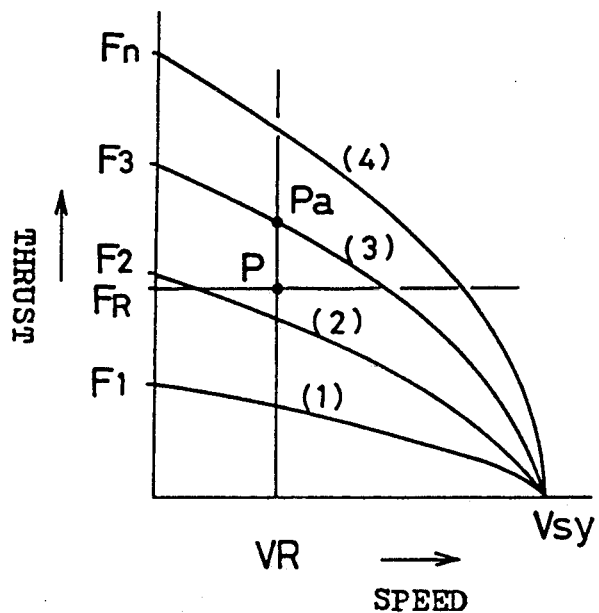
[Fig. 3]
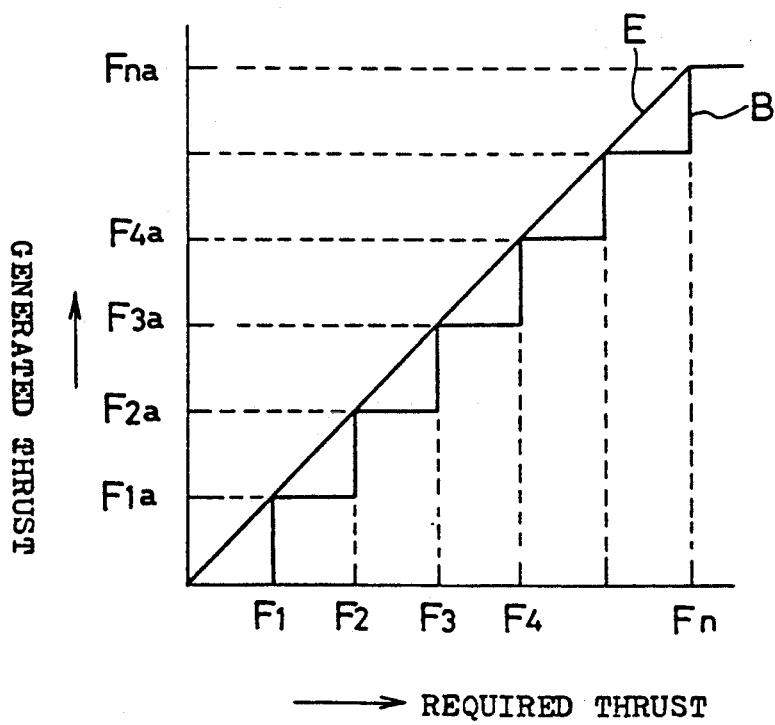

[Fig. 4]
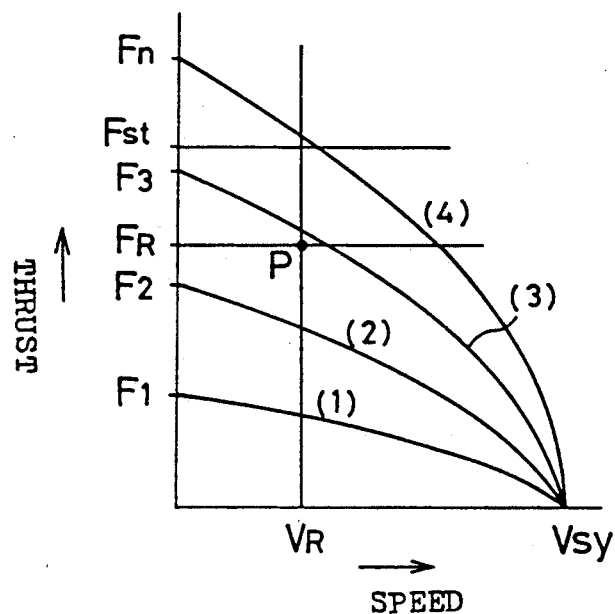
[Fig. 5]
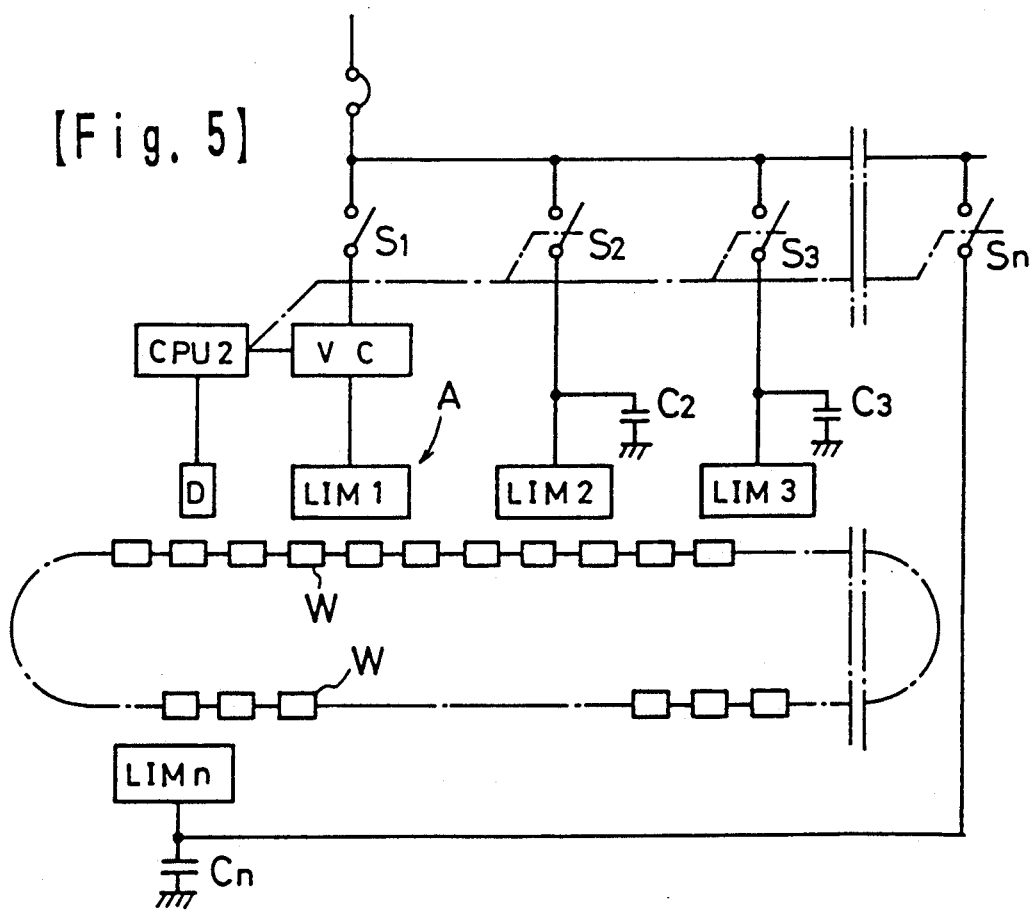

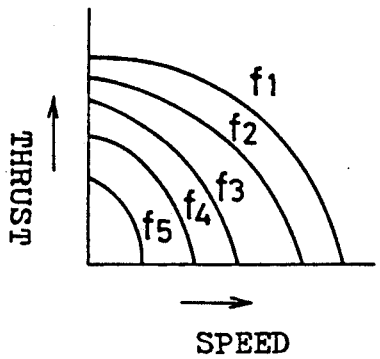
[Fig. 6] PRIOR ART
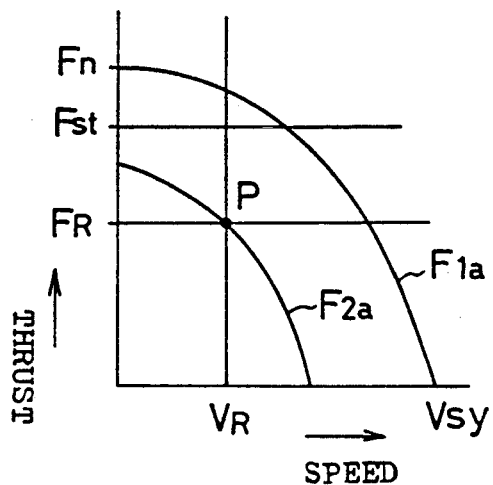
[Fig. 8] PRIOR ART
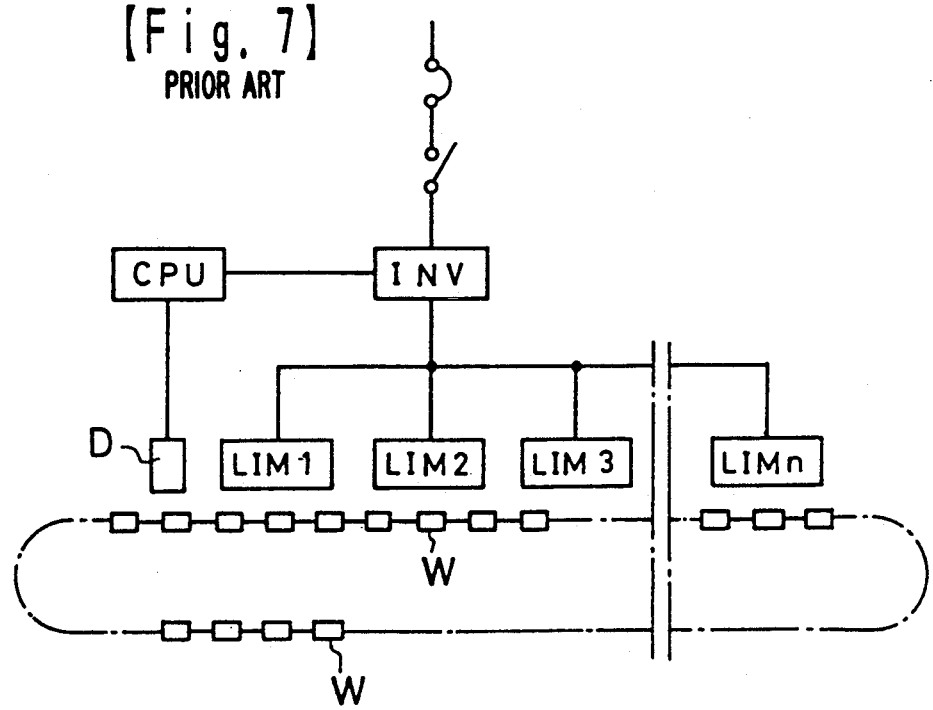
[Fig. 7] PRIOR ART

METHOD OF DRIVING PLURAL LINEAR INDUCTION MOTORS IN A TRANSPORTING SYSTEM

BACKGROUND OF THE INVENTION

1. Field of the Invention

This invention relates to a transporting system driving method using linear induction motors which ensures smooth drive control.

2. Description of the Prior Art

As compared with a rotary type induction motor, a linear induction motor has a large exciting current and a low power factor and efficiency. Therefore, the linear induction motor is rarely used as a driving apparatus for a continuous running system.

Generally, in a transporting apparatus there exists a large difference between the thrust required upon starting and acceleration at full-load and the thrust required during regular speed at non-load. In contrast to the rotary type induction motor, the linear induction motor adopts a direct driving mechanism which cannot use a speed reducer and therefore is required to directly generate high thrust. Thus, most linear induction motors have a large size and capacity, and a system of plural dispersed linear induction motors is usually adopted.

In the linear induction motor, it is impossible to adjust the running speed of a movable body having a secondary conductor using a speed reducer, and therefore adjustment of the running speed is effected by a change of voltage and frequency impressed upon the linear induction motor. A description of such adjustment is made below with reference to FIG. 6–FIG. 8. FIG. 6 shows a speed-thrust characteristic which varies with the frequency impressed upon the linear induction motor. In FIG. 6, each of $f_1, f_2, \ldots, f_5$ denotes a frequency, in which $f_1 > f_2 > f_3 > f_4 > f_5$.

FIG. 7 shows a system for continuously driving movable bodies W, each having a secondary winding, by a plurality of primary windings LIM1, LIM2 ..... LIMn arranged on the ground (including floor surface and table). Movable bodies W are connected in an endless path and each primary winding (hereinafter referred to as a linear induction motor) is connected to a common inverter INV. The CPU (control mechanism) causes the inverter INV to impress signals having a certain frequency and voltage upon the linear induction motors LIM1-LIMn on the basis of speed signals obtained from a movable body running speed detector D.

FIG. 8 shows the main point of the operation mentioned above. Upon starting, in order to generate acceleration exceeding the required starting thrust Fst, a frequency in which thrust characteristic F1a is obtained is generated by the inverter INV and thus starting and acceleration are carried out, whereby movement of the movable bodies starts and is accelerated. When a movable body W has reached the rated speed VR as indicated by a detecting signal from the speed detector D, the CPU gives an instruction to the inverter INV to reduce the frequency and thus the thrust curve F2a which ensures the required running thrust FR is obtained and stable running is carried out.

In the case where an increase in load or change of speed is required during running, the inverter INV generates the required frequency and voltage in accordance with instructions from the CPU, from which each of the linear induction motors LIM1-LIMn generates the required thrust.

In the above case, the output of the linear induction motor during light load running reduces in comparison with the highest thrust (as in the case of the rotary type induction motor), but since the linear induction motor requires a large exciting current, current values are almost constant even when an output change is generated resulting from the increase or decrease in load. Due to the change of the phase difference (power factor) between voltage and current, the effective electric power increases or decreases with the load, but the apparent electric power (KVA) does not change substantially.

Accordingly, in the continuous driving apparatus using plural linear induction motors, if all of the linear induction motors are kept excited at light load, the power source burden resulting from a comparatively large exciting current remains large and a heat loss caused by the coil resistance of the linear induction motor is not changed much. Moreover, from the characteristic of the linear induction motor (lowering of efficiency at light load), the conventional linear induction motor is not recommendable for high efficiency running and requires an inverter of large capacity.

SUMMARY OF THE INVENTION

The present invention has been made to eliminate the defects of the conventional linear induction motor driven system mentioned above. The present invention has for its object to provide a continuous driving apparatus using dispersedly arranged primary linear induction motors in which some of the plural linear induction motors are connected to an inverter control system and the remaining motors are connected directly to a power source. A regular speed is maintained by controlling the inverter according to a speed detecting device, and when the speed changes due to comparatively large variations in load, the remaining linear induction motors are controlled as close to a rated value as possible by selectively disconnecting or connecting the linear induction motors to the power source one by one (or one group by one group). Thus, a highly efficient operation using an inverter of small capacity is achieved.

A difference between a pre-set speed and a running speed is obtained from a speed signal generated by a running speed detecting device. If a decrease in thrust is required, for example, linear induction motors which are connected directly to a power source are disconnected from the power source so that the number of remaining connected linear induction motors corresponds a required step decrease in thrust. A continuous thrust change is obtained by the inverter-controlled linear induction motor.

In the transporting device according to the present invention, by which a plurality of dispersedly arranged linear induction motors are driven continuously, a high thrust is obtained by operatively connecting many linear induction motors upon acceleration and at heavy load, and linear induction motors which are not necessary during normal running are disconnected to increase the efficiency at all times. Inverter control is carried out for the speed changes resulting from comparatively small load changes.

BRIEF DESCRIPTION OF THE DRAWINGS

The nature and advantage of the present invention will be made more clear from the following description with reference to the accompanying drawings, in which:

FIG. 1 through FIG. 3 relate to the first embodiment of the present invention, of which FIG. 1 shows an overall composition of the driving method using a linear induction motor, FIG. 2 depicts a speed-thrust characteristic and FIG. 3 is an explanatory drawing showing the relation between the required thrust and the generated thrust;

FIG. 4 and FIG. 5 relate to the second embodiment of the present invention, of which FIG. 4 depicts a speed-thrust characteristic and FIG. 5 is an explanatory drawing showing the overall composition of the driving method using the linear induction motor; and FIG. 6 through FIG. 8 relate to a conventional example, of which FIG. 6 depicts a speed-thrust characteristic relative to a change in frequency, FIG. 7 is an explanatory drawing of the conventional linear induction motor driven system and FIG. 8 is an explanatory drawing of the relation between speed and thrust during driving.

DETAILED DESCRIPTION OF THE INVENTION

The present invention is described below with reference to the embodiments shown in the drawings.

FIG. 1 through FIG. 3 are for explaining the first embodiment. FIG. 1 shows an overall composition of the first embodiment.

A linear induction motor driven system comprises many primary windings LIM1, LIM2, LIM3 .... LIMn (hereinafter referred to as linear inductor motors) and many movable bodies W fitted with secondary windings and connected in an endless path. Each of the linear induction motors LIM1-LIMn shown may actually be composed of one or plural (a group of) primary windings. One linear induction motor (for example, LIM1) is connected to a power source via an inverter INV, and each of the remaining linear induction motors LIM2 ... LIMn is connected directly to the power source. It is preferable that the linear induction motors LIM-2-LIMn have a smaller output than the linear induction motor LIM1. In FIG. 1, references S1, S2 ... SN denotes electromagnetic switch contacts of a power supply circuit for the respective linear induction motors LIM1-LIMn, and C2-Cn denote phase-advancing condensers for improving the power factor. A detector D detects a moving speed of the movable body W, and the control unit CPU1 is a linear induction motor controlling mechanism. The CPU1 selectively controls the inverter INV and opening and closing of electromagnetic switch contacts S2-Sn for the respective linear induction motors LIM2-LIMn.

The driving of the movable body W in the above composition will now be described. FIG. 2 shows thrust curves when a rated frequency and rated voltage are added to each linear induction motor. More particularly, curve (1) represents a thrust based only on the linear induction motor LIM1, curve (2) represents a thrust based on LIM1+LIM2, curve (3) represents a thrust based on LIM1+LIM2+LIM3, and curve (4) represents a thrust based on LIM1+LIM2+LIM3+LIMn.

Upon starting, all of the linear induction motors LIM-1-LIMn are operated (maximum thrust at this time is Fn), and when the required thrust lowers with the resultant increase in speed (below the thrust curve Fn), linear induction motor LIM2 and/or the subsequent motors are disconnected one by one (or one group by one group). For example, in FIG. 2, suppose the required thrust at the rated speed VR is FR, and the point P thus becomes an operating point.

For operating the linear induction motor driven system at the above operating point P, it is necessary to operate only linear induction motors LIM1, LIM2 and LIM3 (thrust curve (3) in which the working point P is included), and the electromagnetic switch contacts for the linear induction motors other than LIM1, LIM2 and LIM3 are opened.

In the above case, if the output of the inverter is the rated frequency and rated voltage, than the thrust at the speed VR is that at the point Pa, resulting in acceleration according to the difference between Pa and the operating point P. This acceleration is detected by the speed detector D, and a stable operation at the point P is obtained by lowering the output of the inverter INV to the low frequency side using CPU1 (control mechanism).

When an increase in load or a change in speed is required during normal running at the operating P point, an electromagnetic switch contact of any one of the disconnected linear induction motors is closed according to instructions of the CPU1 control mechanism to increase the thrust.

According to the present invention, only the required number of linear induction motors (or groups) are operated according to the required thrust, and the generated thrust of the first linear induction motor LIM1 is changed continuously by control of the inverter.

Therefore, the generated thrust can be changed continuously throughout the entire thrust spectrum due to the first linear induction motor LIM1 and the inverter INV. The reason for this is explained below with reference to FIG. 3.

As shown in FIG. 3, in the case of one linear induction motor, the generated thrust (output) is F1a corresponding to the required thrust F1, and in the case of two linear induction motors, the generated thrust is F2a corresponding to the required thrust F2. Similarly, step increases in the generated thrust are obtained as shown by line B as additional linear induction motors are operated. However, due to thrust control of the first linear induction motor LIM using the inverter INV, the generated thrust in relation to the required thrust throughout the entire spectrum can be made into a completely continuous straight line E.

In the above embodiment, each of the liner induction motors LIM1-LIMn is driven in the same thrust direction. However, a braking effect can be obtained if necessary by causing the first linear induction motor to generate a thrust in the contrary direction.

In FIG. 1, even if the power source circuit of the second and subsequent linear induction motors (LIM2 LIM3 ... LIMn) is opened and only the first linear induction motor LIM1 is operated, the output of the inverter INV decreases to a minimum when the speed is higher than the set point and then the inverter INV ceases its output. In this case, when movement caused by inertia of the movable body W is higher than the preset speed, the CPU1 control mechanism makes the output of the inverter INV into a negative-phase, thus causing a braking action to be carried out.

FIG. 4 and FIG. 5 are for explaining the second embodiment of the invention. In contrast to the first embodiment in which an inverter is used to frequency control the first linear induction motor, the second embodiment employs a voltage controlling device.

FIG. 4 illustrates the speed-thrust characteristics of the linear induction motor driven system, using voltage control, where the rated frequency and the rated voltage are applied. Curve (1) is for the linear induction motor LIM1 only, curve (2) is for the linear induction motors LIM1+ LIM2, and the remaining curves are the same as those shown in FIG. 2.

FIG. 5 shows an overall composition of this second embodiment. In FIG. 5, reference VC designates a voltage controller and reference CPU2 designates a control mechanism which carries out control of the voltage controller VC and switching of the electromagnetic switch contacts S2-Sn of the respective linear induction motors LIM2-LIMn. The remaining components are of the same construction as in the first embodiment and are denoted by the same reference numerals, and further explanation thereof is omitted.

Upon starting, since acceleration power and starting thrust Fst due to a load are required, all of the linear induction motors LIM1-LIMn are operated at the rated frequency and the rated voltage. The speed-thrust characteristic at this time is the curve (4) shown in FIG. 4. In proportion to the resultant increase in speed, the required thrust decreases. The control mechanism CPU2 detects the increased speed and disconnects the second and/or subsequent linear induction motors one by one as in the first embodiment. When the curve draws near the required thrust FR, the control mechanism CPU2 controls the voltage controller VC to lower the voltage to the first linear induction motor LIM1 and consequently to lower the output of the first linear induction motor. Thus, a stable operation is obtained at the point P.

According to the first embodiment, many linear induction motors are arranged one by one (or one group by one group), some of which are subject to a frequency control system (inverter) and the others of which are connected to a power source via an electromagnetic switch contact. Under this arrangement, only a number of linear induction motors corresponding to the required thrust are connected to the power source and the thrust of some linear induction motors is adjusted according to frequency using the inverter. Therefore, the entire driving thrust using the linear induction motors can be adjusted continuously.

In the second embodiment, adjustment of the thrust of some linear induction motors is carried out using a voltage controller, whereby the entire driving thrust can be adjusted continuously as in the first embodiment.

In both embodiments, the linear induction motors which are not necessary are disconnected from the power source and only the necessary minimum number of linear induction motors are operated. Therefore, the linear induction motors can be run in a highly efficient manner at all times and the inverter or voltage controller can be of a small capacity and consequently the size of the control device as a whole can be minimized.

We claim:

1. A transporting system comprising a plurality of primary linear induction motors dispersedly arranged along a traveling track constituting an endless loop and a plurality of movable bodies continuously moving on said traveling track, the movable bodies having a secondary conductor respectively and being connected to one another to form an endless movable body chain, wherein at least one of said linear induction motors is directly controlled by an inverter control apparatus and the others of said induction motors are connected to a power source through a switching means, characterized in that said inverter control apparatus and said switching means are controlled by the speed difference signal between a preset desired speed of the movable bodies and the running speed of the movable bodies detected by a running speed detecting device.

2. A transporting system comprising a plurality of primary linear induction motors dispersedly arranged along a traveling track constituting an endless loop and a plurality of movable bodies continuously moving on said traveling track, the movable bodies having a secondary conductor respectively and being connected to one another to form an endless movable body chain, wherein at least one of said linear induction motors is directly controlled by a voltage controller and the other of said induction motors are connected to a power source through a switching means, characterized in that said voltage controller and said switching means are controlled by the speed difference signal between a preset desired speed of the movable bodies and the running speed of the movable bodies detected by a running speed detecting device.

3. In a transporting system having a plurality of primary linear induction motors dispersedly arranged along a traveling track constituting an endless loop for driving a plurality of movable bodies continuously moving on said traveling track, the movable bodies having a secondary conductor respectively and being connected to one another to form an endless movable body chain, wherein at least one of said linear induction motors is directly controlled by an inverter control apparatus and the others of said induction motors are switchably connected to a power source, a method for controlling the transporting system comprising the steps of:
connecting said at least one linear induction motor to said inverter control apparatus;
presetting a desired speed for the movable bodies;
measuring the running speed of the movable bodies by a running speed detecting device;
obtaining a speed difference signal between the desired speed and the running speed;
switching the others of the linear induction motors onto or out from the power source depending on the speed difference signal, wherein the number of the liner induction motors connected to the power source corresponding to the required thrust of the movable bodies and the time of connection corresponding to the time of thrust change; and
wherein said switching step comprises a step of switching said induction motors one-by-one or group-by-group so that the thrust change is continuous.

4. In a transporting system having a plurality of primary linear induction motors dispersedly arranged along a traveling track constituting an endless loop for driving a plurality of movable bodies continuously moving on said traveling track, the movable bodies having a secondary conductor respectively and being connected to one another to form an endless movable body chain, wherein at least one of said linear induction motors is directly controlled by an inverter control apparatus and the others of said induction motors are switchably connected to a power source, a method for controlling the transporting system comprising the steps of:

connecting said at least one linear induction motor to said inverter control apparatus;
presetting a desired speed for the movable bodies;
measuring the running speed of the movable bodies by a running speed detecting device;
obtaining a speed difference signal between the desired speed and the running speed;
switching the others of the linear induction motors onto or out from the power source depending on the speed difference signal, wherein the number of the liner induction motors connected to the power source corresponding to the required thrust of the movable bodies and the time of connection corresponding to the time of thrust change; and
wherein said switching step comprises a step of switching said induction motors one-by-one or group-by-group so that the thrust change is continuous; and
obtaining braking power, when the running speed of the movable bodies is faster than the preset desired speed even if all of said linear induction motors are stopped, by making said linear induction motor directly controlled by the inverter control apparatus to generate thrust in an opposite direction.

5. In a transporting system having a plurality of primary linear induction motors dispersedly arranged along a traveling track constituting an endless loop for driving a plurality of movable bodies continuously moving on said traveling track, the movable bodies having a secondary conductor respectively and being connected to one another to form an endless movable body chain, wherein at least one of said linear induction motors is directly controlled by a voltage controller and the others of said induction motors are switchably connected to a power source,
   a method for controlling the transporting system comprising the steps of:
   connecting said at least one linear induction motor to said voltage controller;
   presetting a desired speed for the movable bodies;
   measuring the running speed of the movable bodies by a running speed detecting device;
   obtaining a speed difference signal between the desired speed and the running speed;
   switching the others of the linear induction motors onto or out from the power source depending on the speed difference signal, wherein the number of the liner induction motors connected to the power source corresponding to the required thrust of the movable bodies and the time of connection corresponding to the time of thrust change; and
   wherein said switching step comprises a step of switching said induction motors one-by-one or group-by-group so that the thrust change is continuous.

6. In a transporting system having a plurality of primary linear induction motors dispersedly arranged along a traveling track constituting an endless loop for driving a plurality of movable bodies continuously moving on said traveling track, the movable bodies having a secondary conductor respectively and being connected to one another to form an endless movable body chain, wherein at least one of said linear induction motors is directly controlled by a voltage controller and the others of said induction motors are switchably connected to a power source,
   a method for controlling the transporting system comprising the steps of:
   connecting said at least one linear induction motor to said voltage controller;
   presetting a desired speed for the movable bodies;
   measuring the running speed of the movable bodies by a running speed detecting device;
   obtaining a speed difference signal between the desired speed and the running speed;
   switching the others of the linear induction motors onto or out from the power source depending on the speed difference signal, wherein the number of the liner induction motors connected to the power source corresponding to the required thrust of the movable bodies and the time of connection corresponding to the time of thrust change; and
   wherein said switching step comprises a step of switching said induction motors one-by-one or group-by-group so that the thrust change is continuous; and
   obtaining a braking power, when the running speed of the movable bodies is faster than the preset desired speed even if all of said linear induction motors are stopped, by making said linear induction motor directly controlled by the voltage controller to generate thrust in an opposite direction.

* * * * *